United States Patent [19]

Meisch et al.

[11] Patent Number: 5,263,383
[45] Date of Patent: Nov. 23, 1993

[54] VEHICLE SHIFTER WITH PAWL ACTUATOR

[75] Inventors: Richard L. Meisch, Muskegon; Curtis D. Chambers, Norton Shores, both of Mich.

[73] Assignee: Grand Haven Stamped Products Company, Div. of JSJ Corporation, Grand Haven, Mich.

[21] Appl. No.: 962,131

[22] Filed: Oct. 16, 1992

[51] Int. Cl.⁵ .............................. B60K 41/04
[52] U.S. Cl. ........................ 74/475; 74/527; 403/326
[58] Field of Search .............. 74/475, 472, 473 R, 74/527; 403/326, 329

[56] References Cited

U.S. PATENT DOCUMENTS

| | | | |
|---|---|---|---|
| 3,256,031 | 6/1966 | Fillweber | 403/326 |
| 4,343,202 | 8/1982 | Osborn | 74/476 |
| 4,393,729 | 7/1983 | Wilson | 74/475 |
| 4,474,085 | 10/1984 | DeVogelaere et al. | 74/475 X |

FOREIGN PATENT DOCUMENTS

| | | | |
|---|---|---|---|
| 59461 | 2/1924 | Finland | 403/326 |
| 1071984 | 9/1954 | France | 403/326 |

*Primary Examiner*—Rodney H. Bonck
*Assistant Examiner*—William O. Trousdell
*Attorney, Agent, or Firm*—Price, Heneveld, Cooper, DeWitt & Litton

[57] ABSTRACT

A shifter mechanism is provided with an elongated handle having a bore extending along an axis longitudinally of the handle, a rod extending through the bore for actuating a pawl, and a pawl member, the rod and pawl member being provided with a novel connection arrangement for connecting the pawl member to the lower end of the rod. In particular, the connection arrangement includes the lower rod end having an opening at its extreme end extending into a recess within the rod, the recess being defined by a wall, and the pawl member having an upwardly extending upper end adapted to be inserted into the recess. More particularly, the opening and the recess in the lower rod end and the upper end of the pawl each have cross sections whereby the upper end of the pawl member is receivable axially along the bore axis through the opening and into the recess. The pawl member includes a detent recess and the rod wall defining the recess also defines a detent extending in the direction toward the detent recess so that with the detent recess and detent aligned, the pawl member can be attached to the rod lower end by moving the pawl member axially toward the rod.

22 Claims, 3 Drawing Sheets

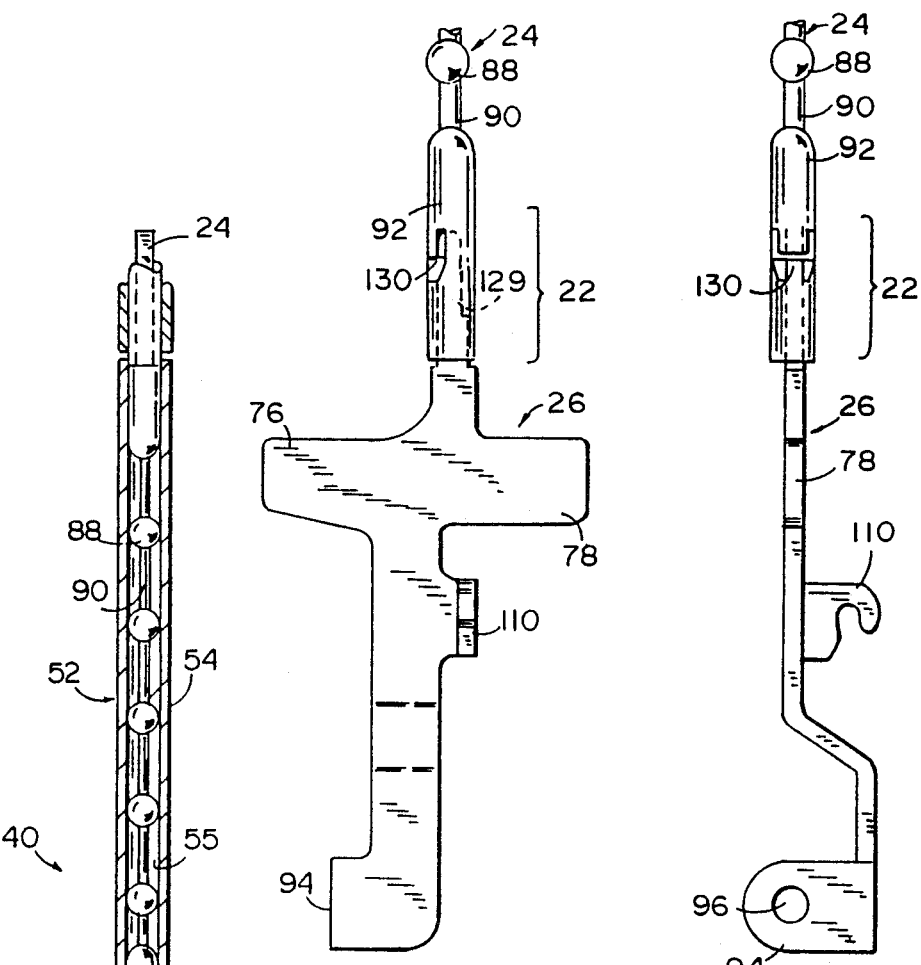
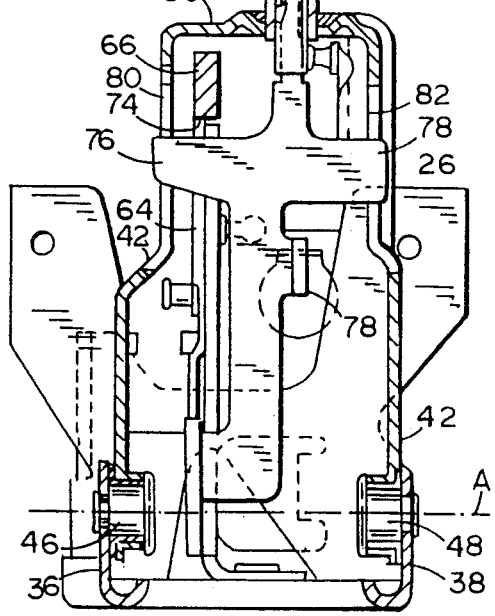
FIG. 2
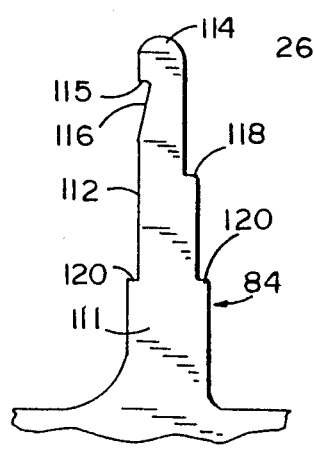
FIG. 6

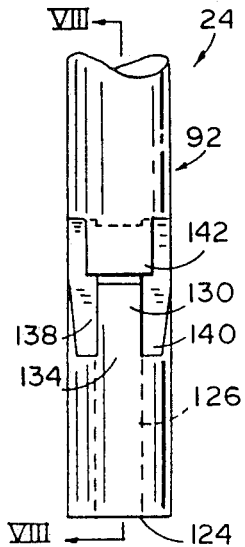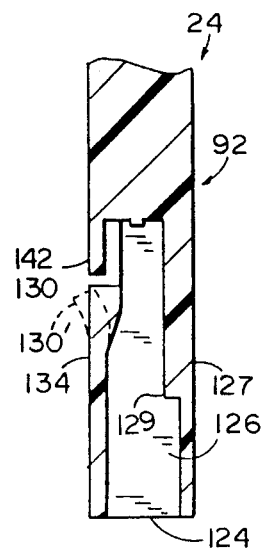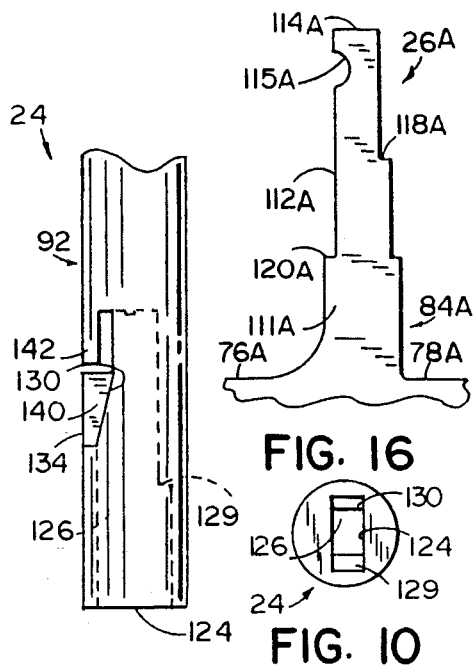
FIG. 7  FIG. 8  FIG. 9  FIG. 16  FIG. 10
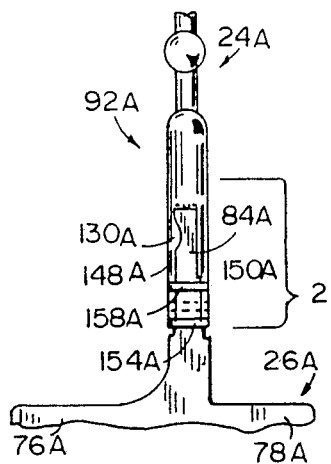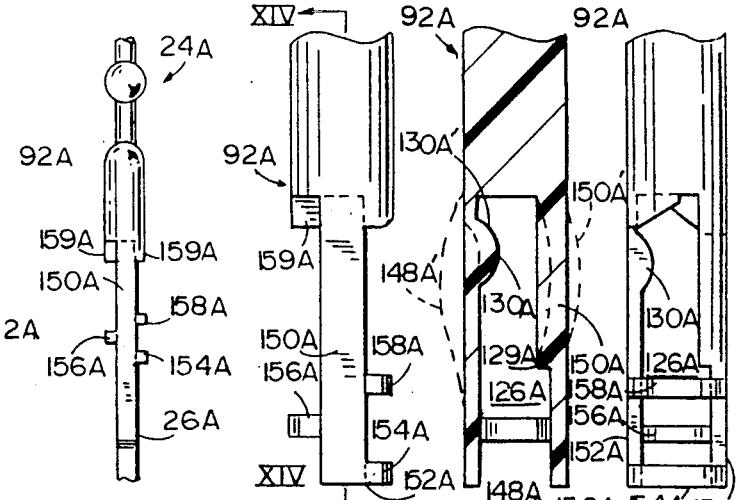
FIG. 11  FIG. 12  FIG. 13  FIG. 14  FIG. 15
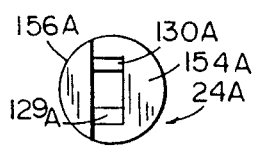
FIG. 17

VEHICLE SHIFTER WITH PAWL ACTUATOR

BACKGROUND OF THE INVENTION

The present invention relates to vehicle shifter mechanisms, and in particular to an improvement for connecting a pawl member to a pawl actuator.

It is known to provide a vehicle transmission shifter mechanism having an elongated handle with a bore extending longitudinally of the handle, and to extend a rod through the bore for actuating a pawl from a hand grip on the handle, the pawl being engageable with a detent plate and being useful for locating the shifter mechanism in various gear shift positions. Various mechanisms have been designed to movably mount the pawl to the shifter mechanism and to operably connect the pawl to the rod. However, these known mechanisms and connections include multiple customized parts and/or a relatively complex subassembly which takes up an unnecessarily high amount of time to assemble, thus driving up the manufacturing costs of the vehicle shifter mechanisms. Still further, the known subassemblies involve multiple rotating and sliding members that require a high level of quality control and present the possibility of warranty problems.

Thus, a shifter mechanism including an improved pawl-to-actuator connection and arrangement is desired to solve the aforementioned problems.

SUMMARY OF THE INVENTION

The present invention includes a vehicle shifter mechanism having an elongated handle with a bore extending along an axis longitudinally of the handle, a rod extending through the bore for actuating a pawl, and a pawl member attached to the rod at the rod's lower end by a novel connection means. The connections means includes an opening at the extreme end of the rod which extends into a recess in the rod, and further includes an upwardly extending upper end of the pawl member which is adapted to mateably engage the recess. In particular, one of the upper end of the pawl member and the wall have a detent recess on one side, and the other of the wall and upper end have a detent extending in a direction toward the detent recess, the detent recess and detent being aligned whereby the detent is received in the detent recess for connecting the rod to the pawl member.

The principle objects of the present invention are to provide a connection means wherein the pawl member can be inserted directly into the rod in an aligned and quickly assembleable manner but which provides a secure connection. Also an object is to provide a connection means allowing use of a reduced number of parts and reduced amount of customization of parts. Further, it is an object to provide a connection means that allows standardization of parts across various vehicle shift mechanisms despite the mechanisms being designed for different vehicle makes and models.

These and other features, advantages and objects of the present invention will be further understood and appreciated by those skilled in the art by reference to the following specification, claims and appended drawings.

BRIEF DESCRIPTION OF THE DRAWINGS

FIG. 2 is a front cross-sectional view taken along the lines II—II in FIG. 1;

FIG. 4 is an enlarged front view of the pawl member and rod lower end assembly as illustrated in FIG. 2;

FIG. 5 is a side view of the pawl member and rod lower end assembly shown in FIG. 4;

FIG. 6 is a fragmentary enlarged front view of the pawl member shown in FIG. 4;

FIG. 7 is an enlarged side view of the lower rod end shown in FIG. 5;

FIG. 8 is a cross-sectional view taken along the lines VIII—VIII in FIG. 7;

FIG. 9 is a front view of the lower rod end shown in FIG. 7;

FIG. 10 is a bottom view of the lower rod end shown in FIG. 7;

FIG. 11 is a fragmentary front view of a modified connection means including a modified pawl member and modified rod lower end embodying the present invention;

FIG. 12 is a side view of the connection means illustrated shown in FIG. 11;

FIG. 13 is an enlarged fragmentary side view of the lower rod end shown in FIG. 12;

FIG. 14 is a cross-sectional view taken along the plane XIV—XIV in FIG. 13;

FIG. 15 is a front view of the lower rod end shown in FIG. 13;

FIG. 16 is an enlarged view of the modified upper end of the pawl member illustrated in FIG. 11; and FIG. 17 is a bottom view of the lower rod end shown in FIG. 13.

DETAILED DESCRIPTION OF THE PREFERRED EMBODIMENTS

Figure 1:
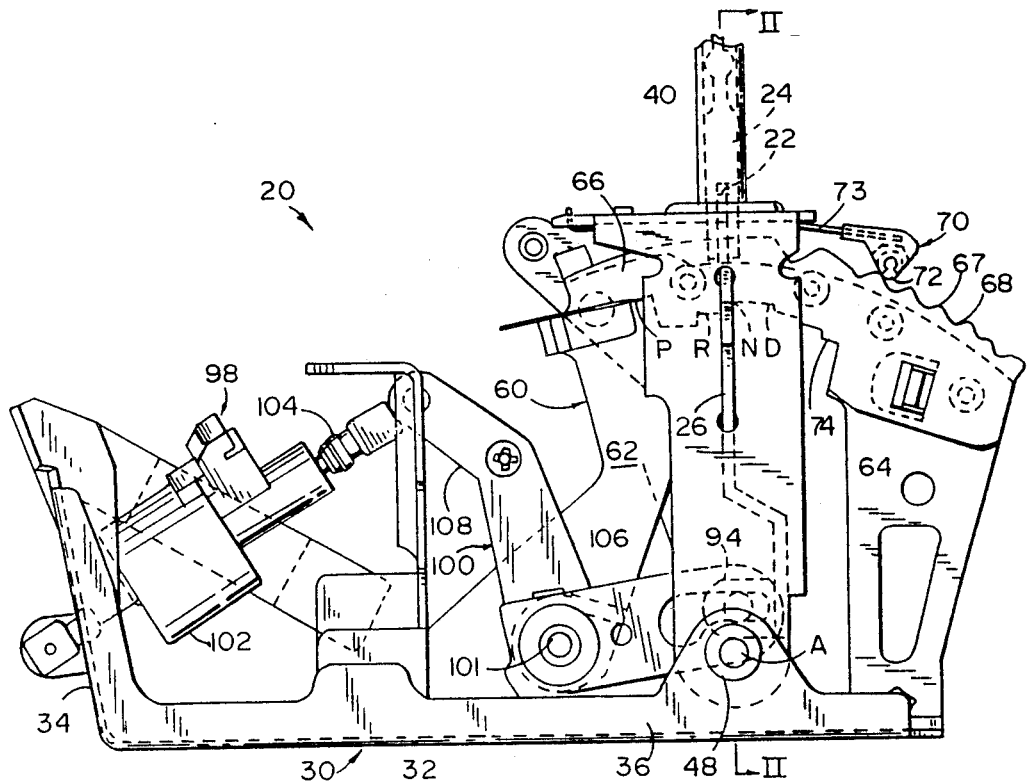
FIG. 1 is a side elevational view of a vehicle shifter mechanism embodying the present invention.

For purposes of the description herein, the terms "upper," "lower," "right," "left," "front," "rear," "vertical," "horizontal" and derivatives thereof shall relate to the invention as oriented in FIG. 1, with the forward end being located generally on the left. However, it is to be understood that the invention may assume various alternative orientations, except where expressly specified to the contrary. It is also to be understood that the specific devices and processes illustrated in the attached drawings, and described in the following specifications are simply exemplary embodiments of the inventive concepts defined in the appended claims. Hence, specific dimensions and other physical characteristics relating to the embodiments disclosed herein are not to be considered as limiting unless the claims expressly state otherwise.

A shifter mechanism embodying the present invention is shown in FIG. 1 and generally referred to as number 20. The focus of the present invention is in a shifter push rod 24 and pawl member 26, and in particular in the connection means 22 connecting same, however the overall shifter mechanism is first described as follows. Shifter mechanism 20 includes a stationary frame 30 having a generally planar bottom 32 adapted to be secured to the floor board of a vehicle, a front flange 34 extending from the front of bottom 32, and a pair of opposing side flanges 36 and 38 extending upwardly from the edges of bottom 32. A shifter lever 40 is pivotally mounted to shift mechanism 20 for movement to various gear shift positions such as "park", "reverse", "drive" and the like.

Shifter lever 40 (FIG. 2) includes an inverted U-shaped lower portion including laterally spaced shift lever legs 42 which are pivotally connected to frame side flanges 36 and 38 on a pivot axis "A" by rivet-like bearings 46 and 48, respectively, and further includes a cross piece 50 connecting legs 42 and 44. A handle 52 is secured to cross piece 50, handle 52 including a tubular post 54 that extends principally above cross piece 50 but also partially through cross piece 50, post 54 including a bore 55 extending longitudinally therein. Handle 52 also includes a hand grip and a push button (not shown) mounted to the top of tubular post 54. The push button is operably connected to the hand grip and to the top of rod 24 for actuating rod 24 in a manner well known in the art.

A detent plate 60 (FIG. 1) having an inverted U-shaped planar configuration includes legs 62 and 64 that are spaced longitudinally, and a detent cross piece 66 interconnecting same. Legs 62 and 64 are secured to shifter mechanism frame bottom 32 by welding and/or riveting with detent cross piece 66 positioned under cross piece 50 of shift lever 40. The top surface 67 of detent cross piece 66 extends generally arcuately in a curvilinear path about axis "A" and includes multiple depressions 68. A feel positioner 70 is secured to and extends laterally rearwardly from shifter lever cross piece 50 into engagement with top surface 67, feel positioner 70 being adapted to give a vehicle operator a feel for each of the gear shift positions of shift lever 40. In particular, feel positioner 70 includes a roller 72 for engaging depressions 68, and further includes a leaf spring 73 extending from shifter lever cross piece 50 to roller 72 to bias roller 72 into engagement with a selected one of depressions 68. The bottom of detent cross piece 66 includes a notched surface 74, notched surface 74 defining the various gear positions of shifter mechanism 20 such as "park" P), "reverse" (R), "neutral" (N), "drive" (D) and the like.

Figure 3:
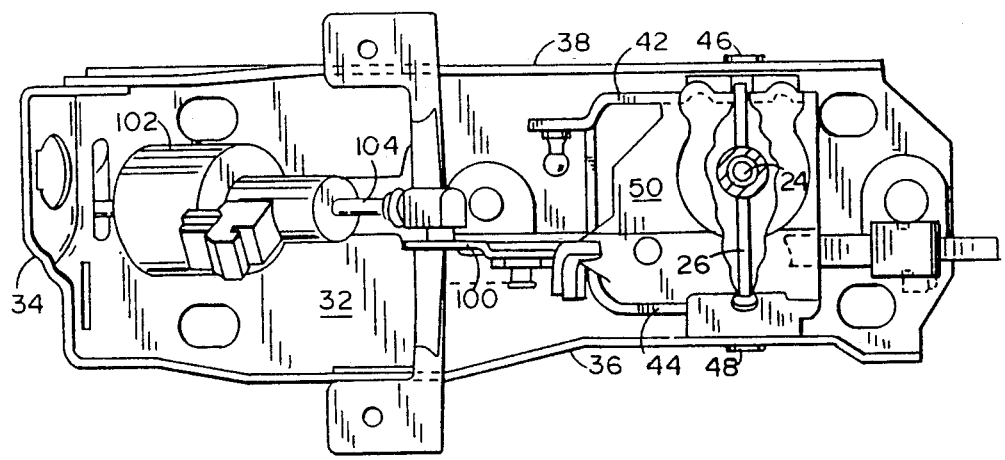
FIG. 3 is a top plan view of the shifter mechanism of FIG. 1.

Pawl member 26 (FIG. 3) is a T-shaped part stamped from sheet metal, and is slideably mounted to shifter lever 40 for reciprocal movement along the longitudinal direction defined by shifter handle post 54, pawl member 26 including arms 76 and 78 that extend laterally slideably into longitudinally extending slots 80 and 82 in shifter lever legs 42 and 44, respectively. Arm 76 extends under detent cross piece 66 and is adapted to operably engage notched surface 74.

Pawl member 26 further includes an upwardly oriented protrusion 84 that connects to the lower end of rod 24 by connection means 22. Rod 24 is an elongated straw-like part made of resilient plastic material such as heat stabilized olefin modified nylon. Rod 24 is slideably positioned in the longitudinally extending bore 55 of post 54, rod 24 being operably connected between the hand grip on the shift lever handle and pawl member 26 so that the operator can move pawl 26 by actuating the push button on the hand grip. Rod 24 includes multiple bulb-like enlargements 88 interconnected by stem-like segments 90, and further includes a specially configured lower and 92 as discussed below.

Pawl member 26 (FIGS. 4 and 5) still further includes a lower end having a flange 94 with hole 96 for attaching to a brake/ignition interlock device 98 (FIG. 1). In particular, interlock device 98 includes a bell crank 100 pivotally mounted to frame 30 by rivet-like bearing 101, and a solenoid 102 with retractable plunger 104. Bell crank 100 includes a first arm 106 slideably and pivotally connected to pawl member flange 94, and a second arm 108 pivotally connected to plunger 104. When it is desired to look pawl member 26 in the upward position so that pawl member arm 76 is securely engaged with and held in a selected notch defined in notched surface 74, solenoid 102 is activated to retract plunger 104, which in turn rotates bell crank 100 causing bell crank arm 106 to force pawl member 26 to the up position. Pawl member 26 also includes a second middle flange 110 (FIG. 4) such as for connecting to a spring (not shown) for biasing pawl member 26 to the upward position.

The focus of the present invention is on rod 24 and pawl member 26, and in particular in the connection means 22 on lower rod end 92 and on pawl member upwardly oriented protrusion 84. Connection means 22 is uniquely configured to permit the rod and pawl member to be interconnected in an axially aligned direction, thus facilitating assembly of the shifter mechanism 20. Further, the connection is completed by simply moving the pawl member 26 and rod 24 together, with the rod 24 including resilient means for locking the pawl member in place once inserted into the rod 24. Thus, assembly of shifter mechanism 20 is simplified, and the number and complexity of parts are reduced. Further, the connection means permits standardization of several parts across different vehicle makes and models, thus offering further advantages of high volume manufacture and reduced inventory of specialized parts.

More particularly, protrusion 84 (FIG. 6) includes a base segment 111 and an insertable finger 112 extending from base segment 111. Finger 12 includes a rounded end surface 114, and further includes a tooth 115 near its end with a notch-like detent recess 116 located along one edge of finger 112. A shoulder 118 is defined about midway along the length of finger 112 on an opposite side of finger 112 from detent recess 116. A pair of second shoulders 120 are defined at the joinder of base segment 111 and finger 112 on both side edges of base segment 111.

Lower rod end 92 (FIG. 8) includes a rectangular opening 124 on its extreme lower end surface 122. Opening 124 opens into a finger receiving recess 126 defined by wall 127, finger receiving recess 126 being configured to mateably receive protrusion finger 112. Finger receiving recess 126 has a rectangular cross-sectional shape, and includes an inwardly oriented shoulder 129 adapted to abuttingly engage intermediate shoulder 118 (FIG. 6) on lower rod end 92 as finger 112 is inserted therein. A detent 130 (FIG. 8) for mateably engaging detent recess 116 is located in the wall 127 defining finger receiving recess 126. Detent 130 is supported by a resilient tab 134, tab 134 being severed or separated from adjacent wall section 127 by opposing cutouts or notches 138 and 140. Hence, tab 134 can be flexed as illustrated in FIG. 8 by the dashed lines labelled as detent 130'. A second tab 142 extends axially downwardly toward detent 130 from a position on lower rod end 92 above detent 130 to protectingly cover tooth 115 (FIG. 6) when protrusion finger 12 of pawl member 26 is installed in recess 126 of rod lower end 92.

Having described the components of shifter mechanism 20 and their interrelationship, and in particular connection means 22, the multiple advantages and uses of the present invention will become apparent to those of ordinary skill in the art. Pawl member 26 is initially located on shifter mechanism 20 with pawl member arms 76 and 78 slideably extending through slots 80 and 82 in shifter lever legs 42 and 44 and arm 76 extending under detent cross piece 66. Upwardly extending protrusion 84 of pawl member 26 aligned axially with lower rod end 92, and then rod 24 and pawl member 26 are securely interconnected by axially forcing same together. In particular, protrusion finger 112 is extended through opening 124 into finger receiving recess 126.

As finger 112 is extended therein, rounded finger end surface 114 engages detent 130, forcing detent 130 and resilient tab 134 to flex outwardly laterally. As finger tooth 115 extends past detent 130, tab 134 resiliently flexes detent 130 back to its original position wherein detent 130 engages detent recess 116 to operably lockingly hold same together (FIGS. 4 and 5). In particular, the memory of the plastic material forming tab 134 causes detent 130 to operably engage detent recess 116 to retain pawl member 26 to rod 24. Due to the rectangular shape of finger receiving recess 126, finger 112 and pawl member 26 cannot rotate within tip receiving recess 126.

With finger 112 installed fully in finger receiving recess 126, intermediate shoulder 118 abuts shoulder 128 on pawl member 26 and second shoulders 120 abut rod lower end surface 122. This abutting engagement prevents excessive pressure being applied to an end of connection means 22. Thus, pawl member 26 can be operably moved by moving rod 24, with connection means 22 retaining same together.

MODIFICATION

Components for a modified shifter mechanism embodying the present invention is generally shown in FIGS. 11-17. In the modified shifter mechanism, similar components to shifter mechanism 20 are shown with identical numbers but with the addition of the letter "A" added thereto. The modified shifter mechanism includes a modified connection means 22A that utilizes less material while maintaining the resilient locking arrangement similar to connection means 22.

In the modified shifter mechanism, pawl member 26A (FIG. 16) includes a finger 112A having a squared extreme end surface 114A and a semicircularly-shaped arcuate detent recess 116A. The remaining features of pawl member 26A are substantially similar to pawl member 26.

Lower rod end 92A (FIGS. 13-15) includes a finger receiving recess 126A defined by opposing sidewall segments 148A and 150A. At the extreme end 152A of lower rod end 92A, a first band of material 154A arcuately interconnects opposing sidewall segments 148A and 150A. A second band 156A also interconnects opposing sidewall segments 148A and 150A, but is spaced above from first band 154A on the opposite side of lower rod end 92A from first band 154A. Notably, from an end view (FIG. 17) first band 154A and second band 156A form a circle having the general diameter of rod 24A. A third band 158A (FIG. 13) extends between opposing sidewall segments 48A and 50A on the same side as first band 154A, with bands 154A, 156A and 158A being spaced equal distances apart and positioned on the lower half of recess 126A. Sidewall segment 148A (FIG. 14) includes a detent 130A and shoulder 129A adapted to mateably engage detent recess 116A and shoulder 118A on pawl member 26A (FIG. 16). Gussets 159A are added at the base of sidewall segments 148A and 150A where they join to lower rod end 92 to reinforce and rigidify opposing sidewall segments 150A. As best shown by the dashed lines in FIG. 14, sidewall segments 148A and 150A are resiliently flexible to a flexed position indicated by 148A' and 150A so as to permit insertion of finger 112A into recess 126A.

Pawl member 26A is attached to rod 24A by inserting protrusion 84A into finger receiving recess 126A. In particular, finger 112A is inserted between opposing sidewall segments 148A and 150A through the recess 126A defined by opposing sidewall segments 148A, 150A and material forming bands 154A, 156A and 158A. As tooth 115A rampingly engages and slideably extends past detent 130A, opposing sidewall segments 148A and 150A extend laterally apart from each other. Once protrusion 84A is fully inserted into rod 24A, detent 130A resiliently flexes back to its original position such that detent 130A is lockingly engaged in detent recess 116A. Notably, the arcuate shape of detent 130A allows tooth 112A to rampingly slip past same during installation.

In the foregoing description it will be readily appreciated by those skilled in the art that modifications may be made to the invention without departing from the concepts disclosed herein. Such modifications are to considered as included in the following claims, unless these claims by their language expressly state otherwise.

The embodiments of the invention in which an exclusive property or privilege is claimed are defined as follows.

1. In a vehicle shifter mechanism having an elongated handle with a bore extending along an axis longitudinally of said handle; a rod extending through said bore for actuating a pawl; and a pawl member attached to said rod at its lower end by a connection means; the improvement comprising:
    said connection means including the lower rod end of said rod comprising an opening at its extreme end extending into a recess having a defined wall;
    said pawl member having an upwardly extending upper end;
    said opening and said recess and said upper end of said pawl member each having cross sections whereby said upper end of said pawl member is receivable along said axis through said opening and into said recess;
    one of said upper end of said pawl member and said wall having a detent recess on at least one side thereof;
    the other of said wall and upper end of said pawl member having a detent extending in a direction toward said detent recess;
    said detent recess and said detent being aligned whereby said detent is received in said detent recess; and
    said detent recess having a notch with a first linear surface, and said detent received in said notch and having a second linear surface engaging said first linear surface when said rod is pushed over said upwardly extending end of said pawl member, said linear surfaces being arranged at an angle to said axis so as to prohibit disconnection of said rod from said pawl member when said rod is pulled in a direction away from said pawl member.

2. The vehicle shifter mechanism of claim 1 in which resilient means is provided for permitting temporary movement of said detent relative to said detent recess in a radial direction from said axis by a radial force directed away from said axis by said upper end of said pawl member when said pawl member is axially forced into said recess, said resilient means returning said detent to its original position when the radial force is released and said detent is aligned with said detent recess whereby when said upper end of said pawl member is axially forced through said opening along said axis into said recess, a portion of said wall is forced by said upper end of said pawl member away from said axis, and when said upper end of said pawl member is in said recess with said detent aligned with said detent recess and said wall is returned by said resilient means to its original position, said detent is located in said detent recess.

3. The vehicle shifter mechanism of claim 2 in which the resilient means is formed by the wall being constructed of a material having memory and by severing portions of the wall of said recess located above and on each side of said detent and detent recess providing a resilient tab.

4. The vehicle shifter mechanism of claim 2 in which the resilient means is formed by the wall being constructed of a material having memory and by severing portions of the wall of said recess on each side of said detent and detent recess, said severed portions being sufficiently wide and long to permit the remaining portion of said wall below said detent and detent recess to flex as said upper end of said pawl member is pushed along said axis through said opening and into said recess.

5. The vehicle shifter mechanism of claim 1 in which said wall includes a first shoulder located opposite and below said detent and said detent recess, said upper end of said pawl member having a second shoulder engaging said first shoulder.

6. The vehicle shifter mechanism of claim 2 in which said wall includes a first shoulder located opposite and below said detent and said detent recess, said upper end of said pawl member having a second shoulder engaging said first shoulder.

7. The vehicle shifter mechanism of claim 3 in which said wall includes a first shoulder located opposite and below said detent and said detent recess, said upper end of said pawl member having a second shoulder engaging said first shoulder when said connection means is complete.

8. The vehicle shifter mechanism of claim 1 in which said detent recess is located on the end of said pawl member and said detent is located on said wall.

9. The vehicle shifter mechanism of claim 8 in which resilient means is provided for permitting said detent to be moved temporarily in a direction away from said axis by a force directed away from said axis, said resilient means returning said detent to its original position when the force is released whereby when said upper end of said pawl member is forced through said opening along said axis, said detent is forced by said upper end of said pawl member away from said axis, and when said connection means is complete, said detent is forced by said resilient means into said recess.

10. The vehicle shifter mechanism of claim 8 in which the resilient means is formed by the wall being constructed of a material having memory and by severing portions of the wall of said recess located above and on each side of said detent and detent recess providing a resilient tab.

11. The vehicle shifter mechanism of claim 8 in which the resilient means is formed by the wall being constructed of a material having memory and by severing portions of the wall of said recess on each side of said detent and detent recess, said severed portions being sufficiently wide and long to permit the remaining portion of said wall below said detent and detent recess to flex as said upper end of said pawl member is pushed along said axis through said opening and into said recess.

12. The vehicle shifter of claim 1 in which at least the lower end of said rod is constructed of a plastic material.

13. The vehicle shifter of claim 2 in which at least the lower end of said rod is constructed of a plastic material.

14. The vehicle shifter of claim 3 in which at least the lower end of said rod is constructed of a plastic material.

15. The vehicle shifter of claim 8 in which the pawl member is stamped metal.

16. A connection means between an elongated plastic straw and a rigid pawl member comprising:
   said plastic straw actuating a pawl;
   said plastic straw having an opening at its extreme end extending into a recess located along the axis of said straw;
   said pawl member having an elongated upper end extending along said axis into said opening and said recess;
   said upper end of said pawl member having a detent recess on one side thereof extending in a direction toward said axis;
   said recess having a wall with a detent extending in a direction toward said axis and received within said detent recess; and
   said detent recess having a notch with a first linear surface, and said detent received in said notch and having a second linear surface engaging said first linear surface, said linear surfaces being arranged at an angle to said axis so as to prohibit disconnection of said rod from said pawl member when said rod is pulled in a direction away from said pawl member.

17. The connection means of claim 16 in which resilient means is provided for permitting said detent to be moved temporarily in a direction away from said axis by a force directed away from said axis, said resilient means returning said detent to its original position when the force is released whereby when said upper end of said pawl member is forced through said opening along said axis into said recess, said detent is forced by said upper end of said pawl member away from said axis, and when said upper end of said pawl member is in said recess with said detent aligned with said detent recess, said detent is forced by said resilient means into said recess.

18. The connecting means of claim 17 in which the resilient means is formed by severing portions of the wall of said recess above and on each side of said detent providing a resilient tab.

19. The connecting means of claim 17 in which the resilient means is formed by severing portions of the wall of said recess on each side of said detent, said severed portions being sufficiently wide and long to permit the remaining portion of said wall below said detent to flex as said upper end of said pawl member is pushed along said axis through said opening and into said recess.

20. The connecting means of claim 16 in which said wall includes a first shoulder located opposite and below said detent, said upper end of said pawl member having a second shoulder engaging said first shoulder when said connection means is complete.

21. A method of assembling a vehicle shifter mechanism having an elongated handle with a bore extending along an axis longitudinally of the handle, a plastic rod extending through the bore, said plastic rod actuating a pawl, and a pawl member, comprising:

providing a lower rod end of the rod with an opening at its extreme end extending into a recess having a defined wall with a resilient detent extending in a direction toward said axis and having a linear surface orthogonal to said axis, said detent having a memory for returning to its original position;

providing a pawl member having an upwardly extending upper end, said opening and said recess and said upper end of the pawl member each having cross sections whereby the upper end of the pawl member is receivable along the axis defined by the bore through the opening and into the recess, said pawl member having a notch for receiving said detent, said notch having a linear surface; and connecting the pawl member to the rod by inserting the rod over the upper end of the pawl member whereby the upper end of the pawl member is extended axially into the recess in the rod to force said resilient detent in a direction away from said axis until said detent is aligned with said notch whereby the detend returns to its original position and enters into said notch with the linear surfaces of said detent and notch engaging each other to prohibit disconnection of said rod and pawl member by pulling of said rod in a direction away from said pawl member.

22. In the method of claim 21 for assembling a vehicle shifter mechanism including the step of temporarily biasing the detent radially outwardly by inserting the pawl member upper end axially into the recess, the material of the rod having a memory generating a retaining force for retaining the pawl member on the rod after the step of connecting the same.

* * * * *

UNITED STATES PATENT AND TRADEMARK OFFICE
CERTIFICATE OF CORRECTION

PATENT NO. : 5,263,383
DATED : November 23, 1993
INVENTOR(S) : Richard L. Meisch et al.

It is certified that error appears in the above-indentified patent and that said Letters Patent is hereby corrected as shown below:

Column 3, line 60:
    "and 92" should be --end 92--.

Column 4, line 2:
    "look" should be --lock--.

Column 4, line 31:
    "Finger 12" should be --Finger 112--.

Column 4, line 59:
    "finger 12" should be --finger 112--.

Column 5, line 10:
    After "As" delete --finger--.

Column 5, line 58:
    "48A and 50A" should be --148A and 150A--.

Column 6, line 2:
    "150A" should be --150A'--.

UNITED STATES PATENT AND TRADEMARK OFFICE
CERTIFICATE OF CORRECTION

PATENT NO. : 5,263,383
DATED : November 23, 1993
INVENTOR(S) : Richard L. Meisch et al.

It is certified that error appears in the above-indentified patent and that said Letters Patent is hereby corrected as shown below:

Column 10, line 9:
    "detend" should be --detent--.

Signed and Sealed this

Ninth Day of August, 1994

Attest:

BRUCE LEHMAN

*Attesting Officer*    *Commissioner of Patents and Trademarks*